United States Patent

Emura et al.

(10) Patent No.: US 9,796,450 B2
(45) Date of Patent: Oct. 24, 2017

(54) BICYCLE FRONT DERAILLEUR

(75) Inventors: Atsuhiro Emura, Osaka (JP); Kazuya Kuwayama, Osaka (JP); Kenkichi Inoue, Osaka (JP)

(73) Assignee: Shimano Inc., Osaka (JP)

( * ) Notice: Subject to any disclaimer, the term of this patent is extended or adjusted under 35 U.S.C. 154(b) by 1699 days.

(21) Appl. No.: 13/109,144

(22) Filed: May 17, 2011

(65) Prior Publication Data

US 2012/0295745 A1 Nov. 22, 2012

(51) Int. Cl.
| | |
|---|---|
| *B62M 9/131* | (2010.01) |
| *B62M 9/134* | (2010.01) |
| *B62M 9/1344* | (2010.01) |
| *B62M 9/1348* | (2010.01) |
| *B62M 9/136* | (2010.01) |

(52) U.S. Cl.
CPC ............ *B62M 9/134* (2013.01); *B62M 9/136* (2013.01); *B62M 9/1344* (2013.01); *B62M 9/1348* (2013.01)

(58) Field of Classification Search
CPC .. B62M 9/134; B62M 9/1344; B62M 9/1348; B62M 9/136
USPC ..................................... 474/80, 82
See application file for complete search history.

(56) References Cited

U.S. PATENT DOCUMENTS

| | | | | |
|---|---|---|---|---|
| 4,551,121 A | * | 11/1985 | Nagano | 474/140 |
| 5,624,336 A | * | 4/1997 | Kojima | 474/82 |
| 6,641,494 B1 | * | 11/2003 | Campagnolo | 474/80 |
| 6,986,723 B2 | * | 1/2006 | Valle | 474/80 |
| 7,963,871 B2 | * | 6/2011 | Peh et al. | 474/82 |
| 2005/0143206 A1 | | 6/2005 | Tetsuka et al. | |
| 2005/0272541 A1 | * | 12/2005 | Valle et al. | 474/80 |
| 2007/0123379 A1 | * | 5/2007 | Peh et al. | 474/80 |
| 2007/0178998 A1 | | 8/2007 | Tetsuka | |
| 2007/0191158 A1 | * | 8/2007 | Ichida et al. | 474/80 |
| 2008/0182689 A1 | * | 7/2008 | Fujii et al. | 474/82 |
| 2008/0305902 A1 | | 12/2008 | Tetsuka et al. | |

FOREIGN PATENT DOCUMENTS

JP 5-254481 A 10/1993

OTHER PUBLICATIONS

European Search Report of corresponding EP Application No. 11 00 8879.6 dated Aug. 27. 2012.

\* cited by examiner

*Primary Examiner* — Michael A Riegelman
(74) *Attorney, Agent, or Firm* — Global IP Counselors, LLP

(57) ABSTRACT

A bicycle front derailleur is basically provided with a base member and a movable member. The base member includes a bicycle mounting portion. The movable member is movably supported to the base member between a retracted position and an extended position relative to the base member. The movable member includes a first guide plate having a first inner surface and a second guide plate having a second inner surface. The first and second inner surfaces face each other to form a chain receiving slot therebetween. The second guide plate includes an adjustable guide member that is arranged at the chain receiving slot to move between at least two different positions relative to the second guide plate.

18 Claims, 5 Drawing Sheets

BICYCLE FRONT DERAILLEUR

BACKGROUND

Field of the Invention

This invention generally relates to a bicycle front derailleur. More specifically, the present invention relates to a bicycle front derailleur in which a width of a chain receiving slot can be adjusted.

Background Information

Generally, a front derailleur is mounted to the bicycle frame adjacent to the front sprockets to shift a chain laterally between the front sprockets. A front derailleur includes a fixed or base member non-movably secured to the bicycle frame, and a movable member with a chain guide that is movably supported relative to the fixed member to move between at least two lateral shift positions. Typically, a linkage assembly is coupled between the fixed member and the movable member in order to movably support the movable member with the chain guide. The chain guide has a pair of cage plates or guide plates arranged to selectively contact and move the chain between the front sprockets. The chain guide is usually moved relative to the base member by pulling and/or releasing a shifter control cable that is coupled between a shifter and the front derailleur. The control cable is often connected to one of the pivotal links to apply a torque thereto in order to move the chain guide between an extended position and a retracted position. One example of this type of a conventional front derailleur is disclosed in U.S. Patent Publication No. 2007/0191158. More recently, front derailleurs have been developed the use other types of arrangements (e.g. an electric motor arrangement, a hydraulic arrangement, etc.) for moving the movable member between an extended position and a retracted position.

SUMMARY

One aspect is to provide a bicycle front derailleur in which a width of a chain receiving slot can be adjusted.

In accordance with one aspect of the present disclosure, a bicycle front derailleur is basically provided with a base member and a movable member. The base member includes a bicycle mounting portion. The movable member is movably supported to the base member between a retracted position and an extended position relative to the base member. The movable member includes a first guide plate having a first inner surface and a second guide plate having a second inner surface. The first and second inner surfaces face each other to form a chain receiving slot therebetween. The second guide plate includes an adjustable guide member that is arranged at the chain receiving slot to move between at least two different positions relative to the second guide plate.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
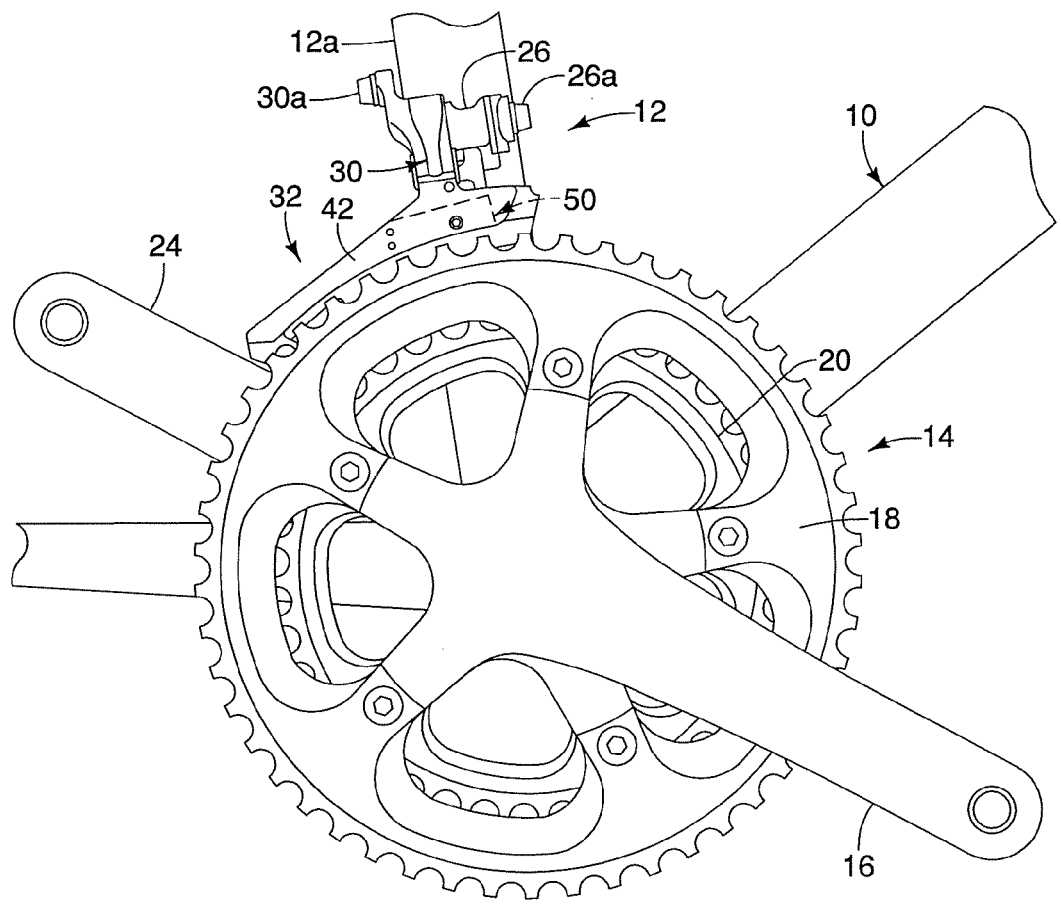
FIG. 1 is a side elevational view of a portion of a bicycle with a front derailleur installed thereon, with the front derailleur having an adjustable guide member in accordance with one illustrated embodiment.

Referring initially to FIG. 1, a bicycle frame 10 is illustrated that is equipped with a bicycle front derailleur 12 in accordance with a first embodiment. The front derailleur 12 moves a bicycle chain (not shown) in a transverse direction with respect to a crankset 14 having a right crank arm 16 and two chain rings 18 and 20. A left crank arm 24 is attached to the right crank arm 16 via a crank axle (not shown) in a conventional manner. The front derailleur 12 is operated in a conventional manner by a shifter (not shown) for selectively positioning a bicycle chain (not shown) over one of the chain rings 18 and 20 of the crankset 14.

Figure 2:
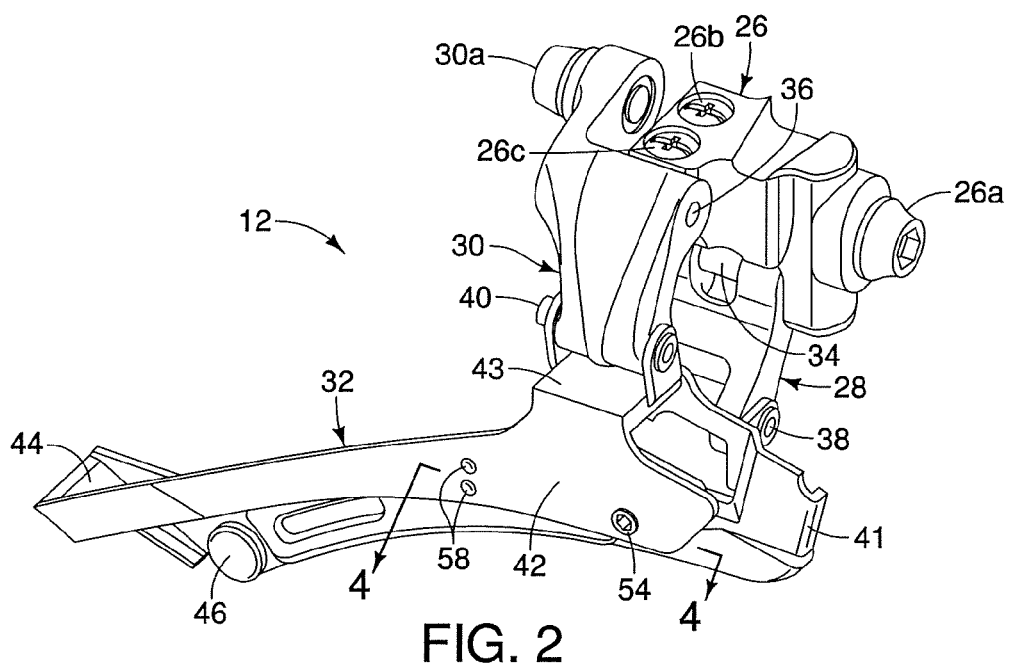
FIG. 2 is a perspective view of the front derailleur shown removed from the bicycle in accordance with the illustrated embodiment.
Figure 3:
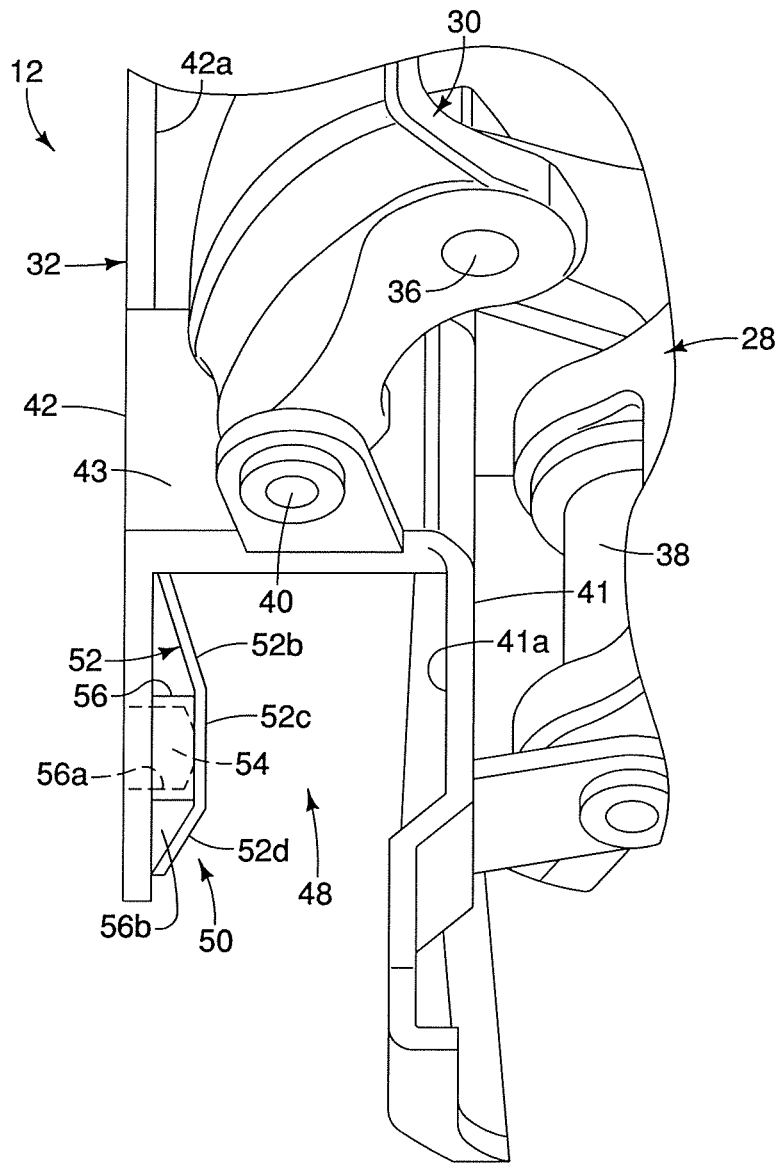
FIG. 3 is a partial top perspective view of a front portion of the chain guide of the front derailleur with the adjustable guide member in a retracted position.
Figure 7:
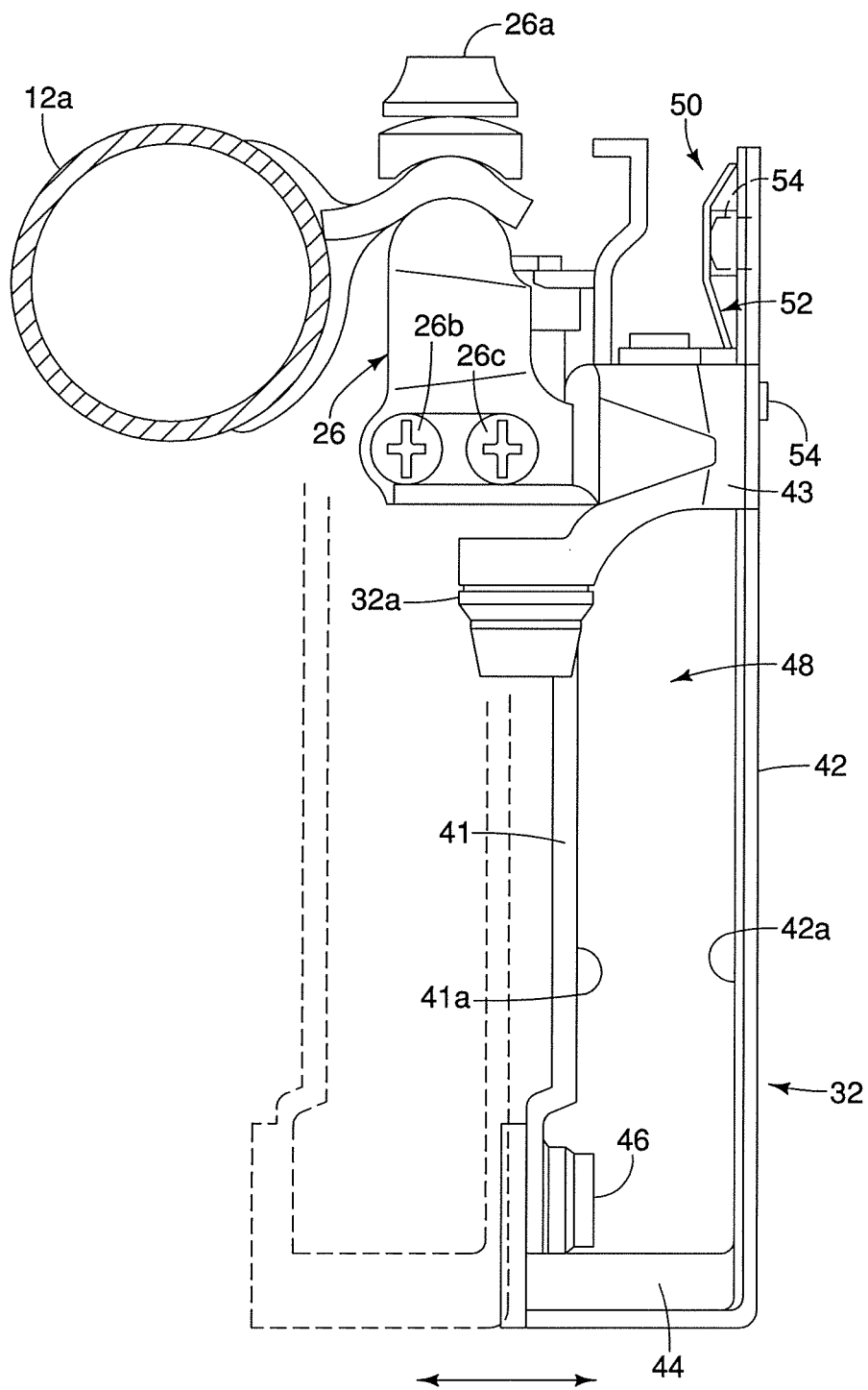
FIG. 7 is a top plan view of the front derailleur illustrated in FIG. 1, with the chain guide in an extended position and a retracted position of the chain guide shown in broken lines.

As shown in FIG. 2, the bicycle front derailleur 12 basically includes a base member 26, an inner link 28, an outer link 30 and a chain guide 32. The chain guide 32 is usually biased in a given direction relative to the base member 26 by a spring (not shown) in a conventional manner. These components of the front derailleur 12 are conventional components, except that the chain guide 32 has been modified as explained below. Thus, the front derailleur 12 is configured and arranged to be operated by a shifter control cable (not shown) in response operation of a shifter (not shown). The shifter control cable is connected to the outer link 30 for applying a torque thereto in order to move the chain guide 32 between a retracted position and an extended position relative to the base member 26 as seen in FIG. 7. In other words, the chain guide 32 is moved relative to the base member 26 by pulling and/or releasing the shifter control cable that is operatively coupled between the shifter and the outer link 30 of the front derailleur 12 for selectively positioning a bicycle chain over one of the chain rings 18 and 20.

The base member 26 is configured to be coupled to a seat tube 12a of the bicycle frame 10 by a mounting screw 26a that constitutes a bicycle mounting portion of the base member 26 as shown in FIG. 1. The base member 26 includes a low position adjustment screw 26b and a top position adjustment screw 26c that finely adjusts the top and low positions of the chain guide 32. In other words, the low position adjustment screw 26b is configured and arranged to change the low shift position of the chain guide 32 relative to the base member 26, while the top position adjustment screw 26c is configured and arranged to change the top shift position of the chain guide 32 relative to the base member 26. The base member 26 is formed with apertures (not shown) that receive generally parallel first and second pivot pins 34 and 36 in a conventional manner to pivotally support first or inner ends of the links 28 and 30. The first and second pivot pins 34 and 36 are preferably spaced apart from one another in a vertical direction with respect to the base member 26 in an installed position with the bicycle in an upright position on a horizontal surface.

The links 28 and 30 have second or outer ends that receive generally parallel third and fourth pivot pins 38 and 40 in a conventional manner to pivotally support the chain guide 32. Thus, the links 28 and 30 constitute a movable member that forms a four-bar linkage together with respective portions of the base member 26 and the chain guide 32. The outer link 30 includes a cable connector 30a for connection to a shifter control cable (not shown in FIG. 2). When the outer link 30 is pulled or released by movement of the shifter control cable, the chain guide 32 is moved between the retracted position and the extended position for moving the bicycle chain between the chain rings 18 and 20.

As shown in FIGS. 3 to 7, the chain guide 32 basically includes a first guide plate 41 and a second guide plate 42. The chain guide 32 is movably supported to the base member 26 by the links 28 and 30 for movement between a retracted position and an extended position relative to the base member 26 as mentioned above. The first guide plate 41 is connected to the second guide plate 42 by a first or upper connecting portion 43 and a second or rear-end connecting portion 44. The first guide plate 41, the second guide plate 42 and the first connecting portion 43 are formed as a one-piece, unitary member. The second connecting portion 44 is also formed preferably formed as a one-piece, unitary member with the second guide plate 42. The second connecting portion 44 is attached to the first guide plate 41 by a fastener 46 (e.g., a rivet). The first guide plate 41 has a first inner surface 41a for contacting and laterally shifting the bicycle chain such that the bicycle chain moves in an outward direction with respect to the bicycle frame 10 between the chain rings 18 and 20. Similarly, the second guide plate 42 has a second inner surface 42a for contacting and laterally shifting the bicycle chain such that the bicycle chain moves in an inward direction with respect to the bicycle frame 10 between the chain rings 18 and 20. The first and second inner surfaces 41a and 42a face each other to form a chain receiving slot 48 therebetween.

As best seen in FIGS. 3 to 7, the second guide plate 42 is provided with an adjustment structure 50 for adjusting a minimum effective width of the chain receiving slot 48 between the first and second inner surfaces 41a and 42a. In other words, the adjustment structure 50 is used to vary the minimum effective width of the chain receiving slot 48 as measured perpendicularly between first and second inner surfaces 41a and 42a. As explained below, the adjustment structure 50 is used for contacting and laterally shifting a bicycle chain during a downshifting operation of the chain from the largest chain ring 18 to the smallest chain ring 20. The first inner surface 41a is disposed between the base member 26 and the second inner surface 42a.

Figure 5:
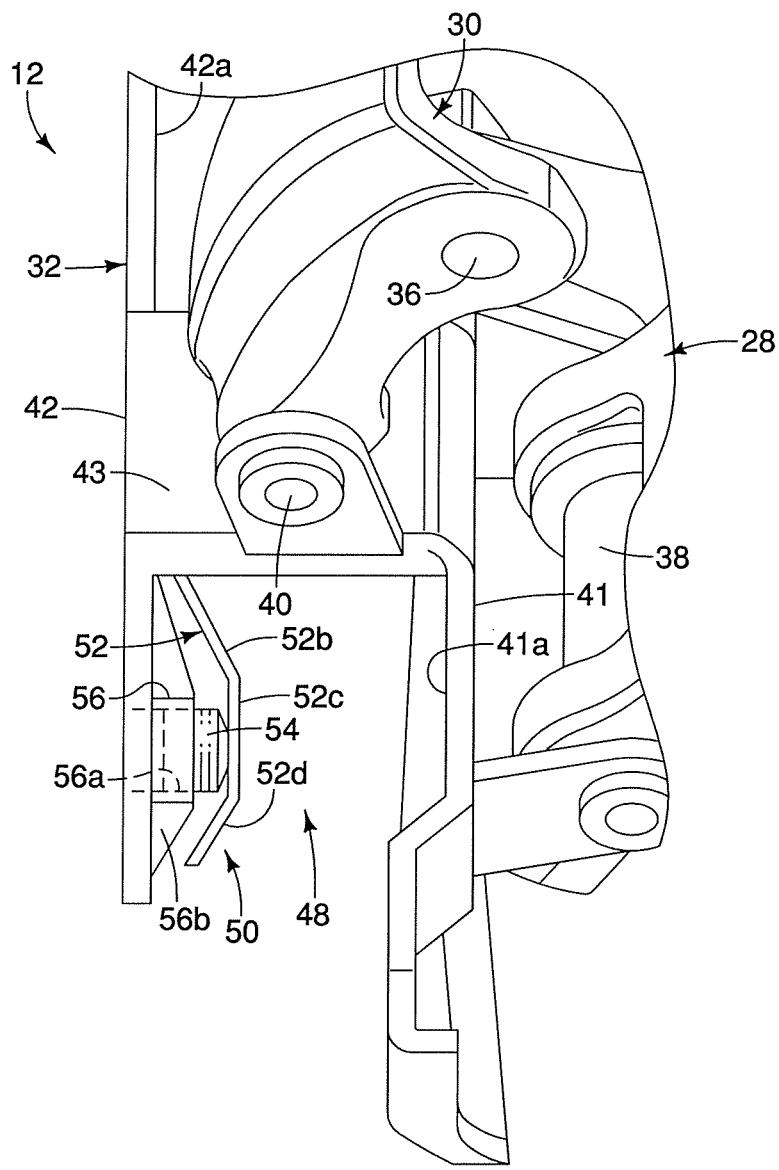
FIG. 5 is a partial top perspective view, similar to FIG. 3, of the front portion of the chain guide of the front derailleur, but with the adjustable guide member in an extended position.
Figure 6:
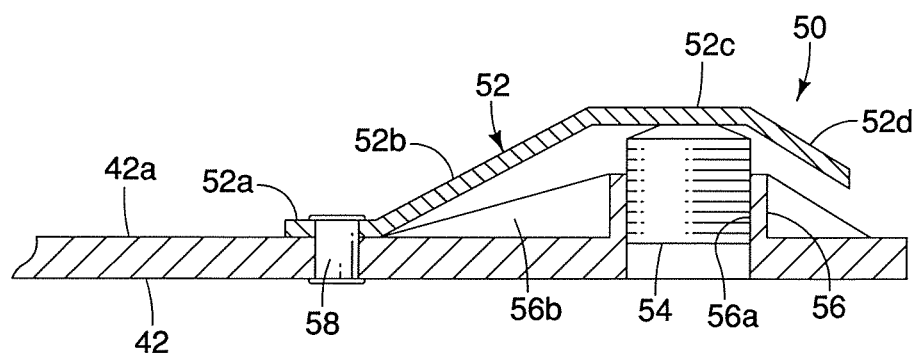
FIG. 6 is a cross-sectional view, similar to FIG. 4, of a portion of the chain guide of the front derailleur, but with the adjustable guide member in the extended position as illustrated in FIG. 5.

The adjustment structure 50 basically includes an adjustable guide member 52 that is arranged at the chain receiving slot 48. The adjustment structure 50 further includes an adjustment member 54 that is movably disposed between the second guide plate 42 and the adjustable guide member 52 such that movement of the adjustment member 54 selectively moves the adjustable guide member 52 relative to the second guide plate 42. In other words, the adjustment member 54 is arranged to move the adjustable guide member 52 between at least two different positions relative to the second guide plate 42 to vary the minimum effective width of the chain receiving slot 48. The adjustment structure 50 further includes a support structure 56 for adjustably supporting the adjustment member 54 to the second guide plate 42. In the illustrated embodiment, the support structure 56 defines a threaded hole 56a in the second guide plate 42. Thus, in the illustrated embodiment, the adjustment member 54 includes a threaded member or set screw that is threadedly disposed in the threaded hole 56a of the second guide plate 42. By turning the adjustment member 54, the user can move the adjustable guide member 52 relative to the second guide plate 42. In this way, the adjustable guide member 52 has an infinite number of adjustment positions between a minimum adjustment position (FIGS. 3 and 4) and a maximum adjustment position (FIGS. 5 and 6). Further, the support structure 56 includes a prevention flange 56b to prevent large debris from entering into a space between the second guide plate 42 and the adjustable guide member 52. Also as shown by a broken line in FIG. 10, an additional prevention flange 56c can be optionally provided. The additional prevention flange 56c is also effective to prevent large debris from entering into a space between the second guide plate 42 and the adjustable guide member 52.

The adjustable guide member 52 becomes the effective inner surface of the second guide plate 42. The adjustable guide member 52 is primarily arranged in an area of the second guide plate 42 that is used for downshifting a chain from the largest chain ring 18 to the middle chain ring 20. Thus, the adjustable guide member 52 is primarily located along a front half of the second inner surface 42a of the second guide plate 42. In this way, the adjustable guide member 52 is used to contact and laterally shift a bicycle chain such that the bicycle chain moves in an inward direction with respect to the bicycle frame 10 from the chain ring 18 to the chain ring 20.

Figure 4:
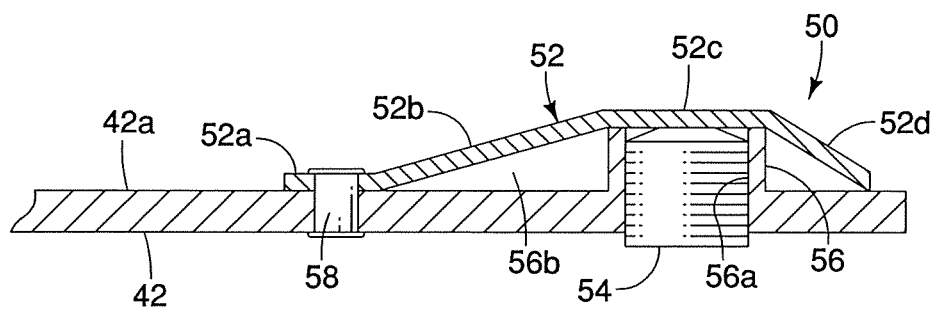
FIG. 4 is a cross-sectional view of a portion of the chain guide of the front derailleur as seen along section line 4-4 of FIG. 2 with the adjustable guide member in the retracted position as illustrated in FIG. 3.
Figure 8:
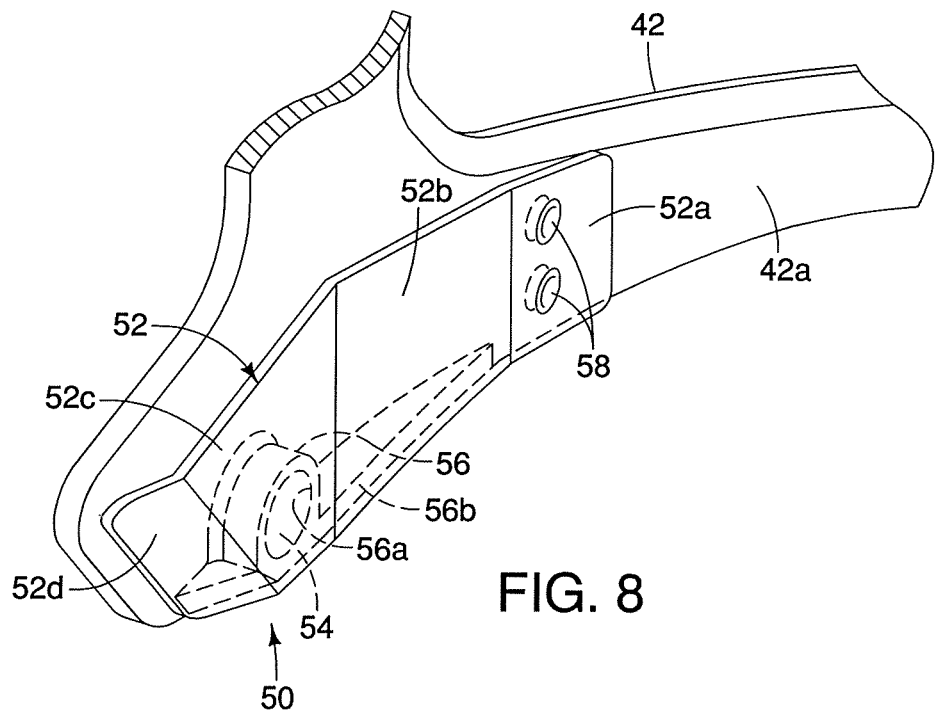
FIG. 8 is a partial perspective view of the front portion of the outer guide plate of the chain guide of the front derailleur illustrated in FIG. 1.

Referring to FIGS. 4, 6 and 8, the adjustable guide member 52 is a one-piece, unitary member that is made of a resilient plate such as a spring metal plate. The adjustable guide member 52 is bent such that the adjustable guide member 52 has an attachment part 52a, an inclined part 52b, a main chain contact part 52c and a front guide part 52d. The attachment part 52a constitutes a first part that is fixed to the second guide plate 42 by a pair of fasteners 58 such as rivets. Of course, the attachment part 52a can be fixed to the second guide plate 42 using other fixing means such as by bond or welding. In any case, the parts 52b, 52c and 52d form a second or cantilevered part of the adjustable guide member 52. The cantilevered part (i.e., the parts 52b, 52c and 52d) is cantilevered relative to the second inner surface 42 of the second guide plate 42. The attachment part 52a is fixed to the second guide plate 42 at a location that is closer to a chain enter side of the chain receiving slot 48 with respect to a front most free end of the cantilevered part (i.e., the parts 52b, 52c and 52d). The adjustable guide member 52 is a resilient plate that is flexed to vary the width of the chain receiving slot 48.

Figure 9:
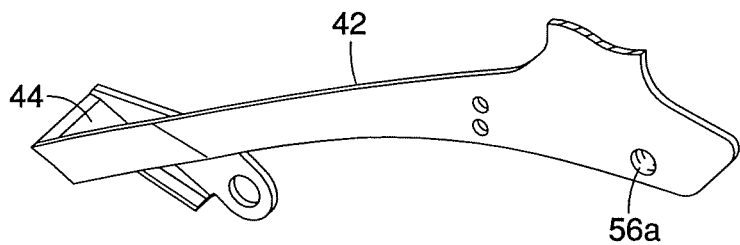
FIG. 9 is an outside perspective view of the outer guide plate of the chain guide of the front derailleur illustrated in FIG. 1.
Figure 10:
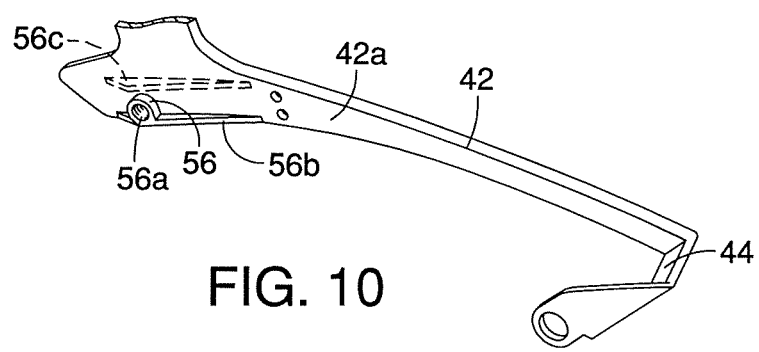
FIG. 10 is an inside perspective view of the outer guide plate of the chain guide of the front derailleur illustrated in FIG. 1.

In the illustrated embodiment, the second guide plate 42 is a one-piece, unitary member, as best seen in FIGS. 9 and 10. The second guide plate 42 is typically made of a rigid metal plate that is bent and shaped to form an outside portion of the chain receiving slot 48. The thickness of the second guide plate 42 is larger than the thickness of the adjustable guide member 52 such that the second guide plate 42 is more rigid than the adjustable guide member 52. However, since the attachment part 52a is fixed to the second guide plate 42 and the main chain contact part 52c is supported by the adjustment member 54, the adjustable guide member 52 does not flex during normal operation of the front derailleur 12. During downshifting of a chain from the largest chain ring 18 to the middle chain ring 20, the main chain contact part 52c of the adjustable guide member 52 contacts the chain to move it laterally towards the base member 26. Thus, the minimum effective width of the chain receiving slot 48 is between the first inner surface 41a and the main chain contact part 52c of the adjustable guide member 52.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein, the following directional terms "forward", "rearward", "front", "rear", "above", "downward", "vertical", "horizontal", "below" and "transverse" as well as any other similar directional terms refer to those directions of a bicycle in an upright, riding position and equipped with the bicycle front derailleur 12. Accordingly, these directional terms, as utilized to describe the bicycle front derailleur 12 should be interpreted relative to a bicycle in an upright riding position on a horizontal surface and that is equipped with the bicycle front derailleur 12. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle front derailleur comprising:
   a base member including a bicycle mounting portion; and
   a chain guide movably supported to the base member between a retracted position and an extended position relative to the base member, the chain guide including a first guide plate having a first inner surface arranged to move and laterally shift a bicycle chain in a first direction and a second guide plate having a second inner surface arranged to move and laterally shift the bicycle chain in a second direction that is opposite the first direction, the first and second inner surfaces facing each other to form opposite lateral sides of a chain receiving slot therebetween,
   the second guide plate including an adjustable guide member arranged at the chain receiving slot to move between at least two different positions relative to the second guide plate.

2. The bicycle front derailleur according to claim 1, wherein
   the adjustable guide member is arranged to move toward the first guide plate.

3. The bicycle front derailleur according to claim 1, wherein
   the first inner surface is disposed between the base member and the second inner surface.

4. The bicycle front derailleur according to claim 1, wherein
   the adjustable guide member has an attachment part that is fixed to the second guide plate and a cantilevered part that is cantilevered relative to the second inner surface of the second guide plate.

5. The bicycle front derailleur according to claim 1, wherein
   the adjustable guide member has an infinite number of adjustment positions between a minimum adjustment position and a maximum adjustment position.

6. A bicycle front derailleur comprising:
   a base member including a bicycle mounting portion;
   a chain guide movably supported to the base member between a retracted position and an extended position relative to the base member, the chain guide including a first guide plate having a first inner surface and a second guide plate having a second inner surface, the first and second inner surfaces facing each other to form a chain receiving slot therebetween, the second guide plate including an adjustable guide member arranged at the chain receiving slot to move between at least two different positions relative to the second guide plate; and
   an adjustment member movably disposed between the second guide plate and the adjustable guide member such that movement of the adjustment member selectively moves the adjustable guide member relative to the second guide plate.

7. The bicycle front derailleur according to claim 6, wherein
   the adjustment member is movably coupled to the second guide plate to move the adjustable guide member relative to the second guide plate.

8. The bicycle front derailleur according to claim 6, wherein
   the adjustment member includes a threaded member disposed in a threaded hole of the second guide plate.

9. The bicycle front derailleur according to claim 6, wherein
the adjustable guide member has a first part that is fixed to the second guide plate and a second part that is cantilevered relative to the second inner surface of the second guide plate.

10. The bicycle front derailleur according to claim 9, wherein
the adjustment member includes a threaded member disposed in a threaded hole of the second guide plate.

11. The bicycle front derailleur according to claim 6, wherein
the adjustable guide member is a resilient plate that is flexed to vary the width of the chain receiving slot.

12. The bicycle front derailleur according to claim 11, wherein
the adjustable guide member has an attachment part that is fixed to the second guide plate and a cantilevered part that is cantilevered relative to the second inner surface of the second guide plate.

13. The bicycle front derailleur according to claim 12, wherein
the attachment part is fixed to the second guide plate at a location that is closer to a chain enter side of the chain receiving slot with respect to a front most free end of the cantilevered part.

14. A bicycle front derailleur comprising:
a base member including a bicycle mounting portion; and
a chain guide movably supported to the base member between a retracted position and an extended position relative to the base member, the chain guide including a first guide plate having a first inner surface and a second guide plate having a second inner surface, the first and second inner surfaces facing each other to form a chain receiving slot therebetween,
the second guide plate including an adjustable guide member arranged at the chain receiving slot to move between at least two different positions relative to the second guide plate, the adjustable guide member being a resilient plate that is flexed to vary the width of the chain receiving slot.

15. The bicycle front derailleur according to claim 14, wherein
the adjustable guide member has an attachment part that is fixed to the second guide plate and a cantilevered part that is cantilevered relative to the second inner surface of the second guide plate.

16. The bicycle front derailleur according to claim 15, wherein
the attachment part is fixed to the second guide plate at a location that is closer to a chain enter side of the chain receiving slot with respect to a front most free end of the cantilevered part.

17. A bicycle front derailleur comprising:
a base member including a bicycle mounting portion; and
a chain guide movably supported to the base member between a retracted position and an extended position relative to the base member, the chain guide including a first guide plate having a first inner surface arranged to move and laterally shift a bicycle chain in a first direction and a second guide plate having a second inner surface arranged to move and laterally shift the bicycle chain in a second direction that is opposite the first direction, the first and second inner surfaces facing each other to form opposite lateral sides of a chain receiving slot therebetween,
the second guide plate including an adjustable guide member arranged at the chain receiving slot to move between at least two different positions relative to the second guide plate, and
the adjustable guide member having an attachment part fixed to the second guide plate and a cantilevered part cantilevered relative to the second inner surface of the second guide plate.

18. A bicycle front derailleur comprising:
a base member including a bicycle mounting portion; and
a chain guide movably supported to the base member between a retracted position and an extended position relative to the base member, the chain guide including a first guide plate having a first inner surface and a second guide plate having a second inner surface, the first and second inner surfaces facing each other to form a chain receiving slot therebetween,
the second guide plate including an adjustable guide member arranged at the chain receiving slot to move between at least two different positions relative to the second guide plate, the adjustable guide member being a resilient plate that is flexed to vary the width of the chain receiving slot, and
the adjustable guide member having an attachment part fixed to the second guide plate and a cantilevered part cantilevered relative to the second inner surface of the second guide plate.

* * * * *